(12) United States Patent
Campion et al.

(10) Patent No.: US 11,225,933 B2
(45) Date of Patent: Jan. 18, 2022

(54) TWIN OUTLET CHECK LIQUID FUEL INJECTOR FOR DUAL FUEL SYSTEM

(71) Applicant: Caterpillar Inc., Deerfield, IL (US)

(72) Inventors: Robert M. Campion, Chillicothe, IL (US); Dean Craig Diers, Sturgis, SD (US); Sana Mahmood, Albuquerque, NM (US); Jonathan Anders, Peoria, IL (US); Bobby John, Peoria, IL (US); Jonathan Richard Chittenden, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 102 days.

(21) Appl. No.: 16/041,061

(22) Filed: Jul. 20, 2018

(65) Prior Publication Data

US 2020/0025154 A1 Jan. 23, 2020

(51) Int. Cl.
| | |
|---|---|
| *F02M 21/02* | (2006.01) |
| *F02B 23/02* | (2006.01) |
| *F02B 69/04* | (2006.01) |
| *F02M 61/18* | (2006.01) |

(52) U.S. Cl.
CPC ......... *F02M 21/0263* (2013.01); *F02B 23/02* (2013.01); *F02B 69/04* (2013.01); *F02M 21/0275* (2013.01); *F02M 61/186* (2013.01); *F02M 61/1813* (2013.01); *F02B 2201/06* (2013.01)

(58) Field of Classification Search
CPC ........... F02M 21/0263; F02M 21/0275; F02M 61/1813; F02M 61/186; F02M 43/04; F02M 45/086; F02M 63/0064; F02M 2200/44; F02B 23/02; F02B 69/04; F02B 2201/06; F02D 19/0694; F02D 19/0689

USPC ........................................................ 123/304
See application file for complete search history.

(56) References Cited

U.S. PATENT DOCUMENTS

| | | |
|---|---|---|
| 6,499,467 B1 | 12/2002 | Morris |
| 6,601,566 B2 | 8/2003 | Gillis et al. |
| 6,705,543 B2 | 3/2004 | Carroll, III et al. |
| 7,556,017 B2 | 7/2009 | Gibson |

(Continued)

FOREIGN PATENT DOCUMENTS

| | | |
|---|---|---|
| CN | 105464865 A | 11/2017 |
| WO | 2006018439 A1 | 2/2006 |

(Continued)

OTHER PUBLICATIONS

WIPO, Written Opinion of the International Searching Authority PCT 2019/040130, dated Oct. 14, 2019.

*Primary Examiner* — Joseph J Dallo
*Assistant Examiner* — Scott A Reinbold
(74) *Attorney, Agent, or Firm* — Brannon Sowers & Cracraft (57) ABSTRACT

A liquid fuel injector such as for a dual fuel system in an internal combustion engine includes two-way injection control valves for controlling twin outlet checks. A first set of orifices are arranged in an A-F-Z pattern, and a second set of orifices are arranged in an A-F-Z pattern, within the fuel injector, among a high-pressure inlet passage, a low-pressure space, and first and second outlet check control chambers, respectively. A common nozzle supply cavity is fluidly connected to the high-pressure inlet passage and supplies each of two sets of nozzle outlets opened and closed by the twin outlet checks.

16 Claims, 3 Drawing Sheets

(56) References Cited

U.S. PATENT DOCUMENTS

| | | |
|---|---|---|
| 8,944,027 B2 | 2/2015 | Montgomery |
| 9,506,434 B2 | 11/2016 | Coldren |
| 2007/0246561 A1 | 10/2007 | Gibson |
| 2010/0133361 A1 | 6/2010 | Futonagane et al. |
| 2012/0111965 A1 | 5/2012 | Ibrahim |
| 2012/0255523 A1 | 10/2012 | Kim et al. |
| 2013/0048750 A1 | 2/2013 | Hoisan |
| 2013/0098333 A1 | 4/2013 | Hoisan |
| 2014/0061326 A1* | 3/2014 | Coldren ................ F02M 43/04 239/5 |
| 2014/0196687 A1* | 7/2014 | Coldren .............. F02D 19/0694 123/299 |
| 2014/0311455 A1* | 10/2014 | Kim ........................ F02D 19/10 123/472 |
| 2015/0247468 A1 | 9/2015 | Chittenden |
| 2016/0195028 A1* | 7/2016 | Redon ................ F02D 19/0602 123/299 |
| 2017/0218897 A1 | 8/2017 | Kalenborn |
| 2019/0186448 A1* | 6/2019 | Mahmood .......... F02M 63/0064 |
| 2020/0063701 A1* | 2/2020 | Anders ................ F02M 47/027 |
| 2020/0063704 A1* | 2/2020 | Anders ............. F02M 61/1826 |

FOREIGN PATENT DOCUMENTS

| | | | |
|---|---|---|---|
| WO | 2012150377 A1 | 11/2012 | |
| WO | 2017203092 A1 | 11/2017 | |
| WO | WO-2017203092 A1 * | 11/2017 | ........... F02M 47/027 |

* cited by examiner

TWIN OUTLET CHECK LIQUID FUEL INJECTOR FOR DUAL FUEL SYSTEM

TECHNICAL FIELD

The present disclosure relates generally to a liquid fuel injector for a fuel system in an internal combustion engine, and relates more particularly to a liquid fuel injector having twin outlet checks and fuel outlets supplied by a common nozzle supply cavity.

BACKGROUND

Modern internal combustion engines designed to run on more than one type of fuel are of increasing commercial interest. In the compression ignition engine context, so-called dual fuel engines may include a supply of liquid fuel, such as a diesel distillate fuel, as well as a cryogenically or otherwise stored gaseous fuel. Gaseous fuels can offer advantages such as reduced emissions of certain types and in many instances lower cost. Diesel fuel tends to be associated with greater performance in at least certain applications. Designs are known where an operator or an engine control unit can switch between a diesel-only mode and a gaseous fuel-only mode or a blended mode.

In some instances, it can be advantageous to use a relatively small or pilot amount of diesel fuel to ignite a larger, main charge of gaseous fuel. It is typical for such dual fuel engines to employ a liquid fuel injector positioned directly within the combustion cylinder, which is operated to inject a pilot amount of diesel fuel when the engine is to be operated predominantly on gaseous fuel, and to inject a larger, main injection of liquid fuel when the engine is to be operated in diesel-only mode. While such systems have shown promise, there can be controllability issues associated with attempting to operate the fuel injector to inject relatively tiny pilot injections some of the time, and far larger main injections at other times. U.S. Pat. No. 9,638,118 to Schaller et al. is directed to a System and Method For Supplying Natural Gas To A Dual Fuel Engine, and illustrates one known design.

SUMMARY OF THE INVENTION

In one aspect, a liquid fuel injector for an internal combustion engine includes an injector body defining a high-pressure inlet passage, a first set of nozzle outlets, a second set of nozzle outlets, a first control chamber, and a second control chamber each in fluid communication with the high-pressure inlet passage, and a low-pressure space. The liquid fuel injector further includes a first outlet check having a closing hydraulic surface exposed to a fluid pressure of the first control chamber and movable between a closed position blocking the first set of nozzle outlets, and an open position. The liquid fuel injector further includes a second outlet check having a closing hydraulic surface exposed to a fluid pressure of the second control chamber and movable between a closed position blocking the second set of nozzle outlets, and an open position. The liquid fuel injector still further includes a first two-way injection control valve positioned fluidly between the first control chamber and the low-pressure space, and a second two-way injection control valve positioned fluidly between the second control chamber and the low-pressure space. The injector body further defines a first set of orifices arranged in an A-F-Z pattern among the high-pressure inlet passage, the low-pressure space, and the first control chamber, and a second set of orifices arranged in an A-F-Z pattern among the high-pressure inlet passage, the low-pressure space, and the second control chamber. The injector body further defines a common nozzle supply cavity in fluid communication with the high-pressure inlet passage, and the first set of nozzle outlets and the second set of nozzle outlets are in fluid communication with the common nozzle supply cavity at the open position of the first outlet check and the second outlet check, respectively.

In another aspect, a fuel system for an internal combustion engine includes a pressurized liquid fuel supply, and a plurality of liquid fuel injectors each defining a high-pressure inlet passage, a first set of nozzle outlets, a second set of nozzle outlets, a first control chamber, and a second control chamber each in fluid communication with the high-pressure inlet passage, and a low-pressure space. The plurality of liquid fuel injectors each include a first outlet check having a closing hydraulic surface exposed to a fluid pressure of the first control chamber, and the second outlet check having a closing hydraulic surface exposed to a fluid pressure of the second control chamber. The plurality of liquid fuel injectors each further including a first injection control valve positioned fluidly between the first control chamber and the low-pressure space, and a second injection control valve positioned fluidly between the second control chamber and the low-pressure space. The plurality of liquid fuel injectors each further define a first set of orifices arranged in an A-F-Z pattern among the high-pressure inlet passage, the low-pressure space, and the first control chamber, and a second set of orifices arranged in an A-F-Z pattern among the high-pressure inlet passage, the low-pressure space, and the second connector channel. The plurality of liquid fuel injectors each further define a common nozzle supply cavity in fluid communication with the high-pressure inlet passage. The first outlet check and the second outlet check are each movable between an open position where the corresponding first set of nozzle outlets and second set of nozzle outlets are in fluid communication with the common nozzle supply cavity, and a closed position.

In still another aspect, an orifice plate for a stack in a liquid fuel injector in a fuel system includes a one-piece orifice plate body defining a center axis extending between an upper plate body side and a lower plate body side, and an outer peripheral edge extending circumferentially around the center axis. The orifice plate body further has a plurality of raised sealing surfaces formed on the upper side, for forming seals with an adjacent stack piece in the stack, and a recessed surface positioned axially inward of the raised sealing surfaces. The orifice plate body further has a first inlet passage and a second inlet passage extending between the upper plate body side and the lower plate body side, for feeding high-pressure fuel to a first control chamber for a first outlet check and a second control chamber for a second outlet check, respectively. The orifice plate body further has a first outlet passage and a second outlet passage extending between the lower plate body side and the upper plate body side for connecting the first and the second control chamber to a low-pressure space. A first set of orifices are in the orifice plate body and include a first A-orifice formed in the first outlet passage, a first Z-orifice formed in the first inlet passage, and a first F-orifice. A second set of orifices are in the orifice plate body and include a second A-orifice formed in the second outlet passage, a second Z-orifice formed in the second inlet passage, and a second F-orifice. The first and the second F-orifices fluidly connect the first and the second outlet passages to the lower plate body side to fluidly connect a nozzle supply cavity in a liquid fuel injector to each of the first and the second control chambers.

DETAILED DESCRIPTION

Figure 1:
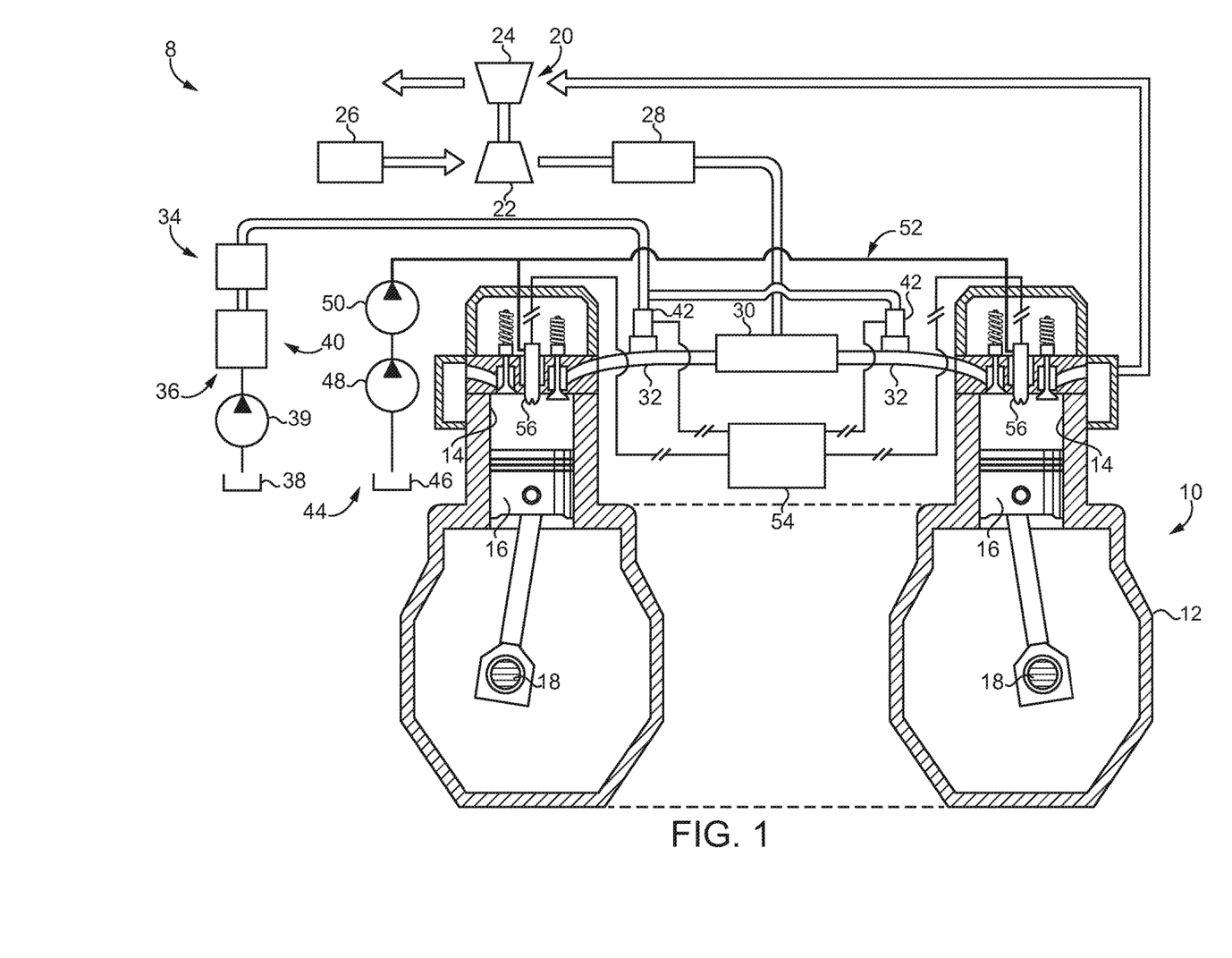
FIG. 1 is a partially sectioned side diagrammatic view of an internal combustion engine system, according to one embodiment.

Referring to FIG. 1, there is shown an internal combustion engine system 8 (hereinafter "engine system 8"), according to one embodiment. Engine system 8 can include a dual fuel engine system structured to operate on two different fuels, typically a liquid fuel and a gaseous fuel. In an implementation, the liquid fuel can include diesel distillate fuel and the gaseous fuel can include natural gas, methane, or other hydrocarbon fuels or blends that are gaseous at standard temperature and pressure. Engine system 8 includes an internal combustion engine 10 having a housing 12 with a plurality of combustion cylinders 14 formed therein. Cylinders 14 can be of any number and in any suitable arrangement such as an in-line arrangement, a V-configuration, or still another arrangement. A piston 16 is movable within each one of combustion cylinders 14 to rotate a crankshaft 18 in a generally conventional manner. Engine system 8 can further include an intake conduit 26 structured to feed air for combustion to combustion cylinders 14 by way of a turbocharger 20 including a compressor 22 and a turbine 24. An aftercooler 28 is positioned downstream of compressor 22 and conveys cooled and compressed air to an intake manifold 30. A plurality of intake runners 32 extend between intake manifold 30 and each of combustion cylinders 14, again in a generally conventional manner.

Engine system 8 further includes a fuel system 34 including a gaseous fuel subsystem 36 and a liquid fuel subsystem 44. Gaseous fuel subsystem 36 includes a fuel supply 38 which can provide a gaseous fuel, in a cryogenically stored liquid state, to vaporization and pressurization equipment 40 by way of a pump 39. Equipment 40 can include a vaporizer, structured to transition the gaseous fuel from a liquid state to a gaseous state, a pressurization pump structured to pressurize the gaseous fuel for delivery to engine 10, and various other known monitoring and regulating components. In the illustrated embodiment, a gaseous fuel admission valve 42 is coupled with each intake runner 32. In other embodiments one or more gaseous fuel admission valves could convey gaseous fuel into intake manifold 30, or elsewhere upstream of intake manifold 30 such as upstream of compressor 22. In still other embodiments a gaseous fuel admission valve in the nature of a gaseous fuel injector could be positioned to inject gaseous fuel directly into each one of combustion cylinders 14.

Liquid fuel subsystem 44 includes a liquid fuel supply 46 such as a fuel tank, and can include at least one pump structured to convey the liquid fuel to engine 10. In the illustrated embodiment a low-pressure transfer pump 48 receives fuel from supply 46 and transitions the fuel to a high-pressure pump 50 that feeds a pressurized fuel reservoir 52 such as a common rail. It should be appreciated that a single monolithic pressurized fuel reservoir could be used, as well as a plurality of separate pressure accumulators, or still another strategy such as a plurality of unit pumps. An electronic control unit 54 may be coupled with each gaseous fuel admission valve 42, as well as a plurality of liquid fuel injectors 56 of liquid fuel subsystem 44. Liquid fuel injectors 56 may each be coupled with engine housing 12 and positioned so as to extend at least partially into each one of combustion cylinders 14. Each liquid fuel injector 56 can include twin outlet checks, as further discussed herein, structured to inject liquid fuel in different quantities, at different spray angles, for example, and for different purposes, including production of a pilot charge for igniting a main charge of gaseous fuel, as well as injection of a main charge of liquid fuel. Those skilled in the art will appreciate the potential application of the twin outlet check liquid fuel injectors to so-called diesel-only mode operation, mixed-mode or blended-mode operation, and still other operating strategies. As will be further apparent from the following description, it is contemplated that separate control and separate design of the twin outlet checks enables optimization for their different intended purposes.

Figure 2:
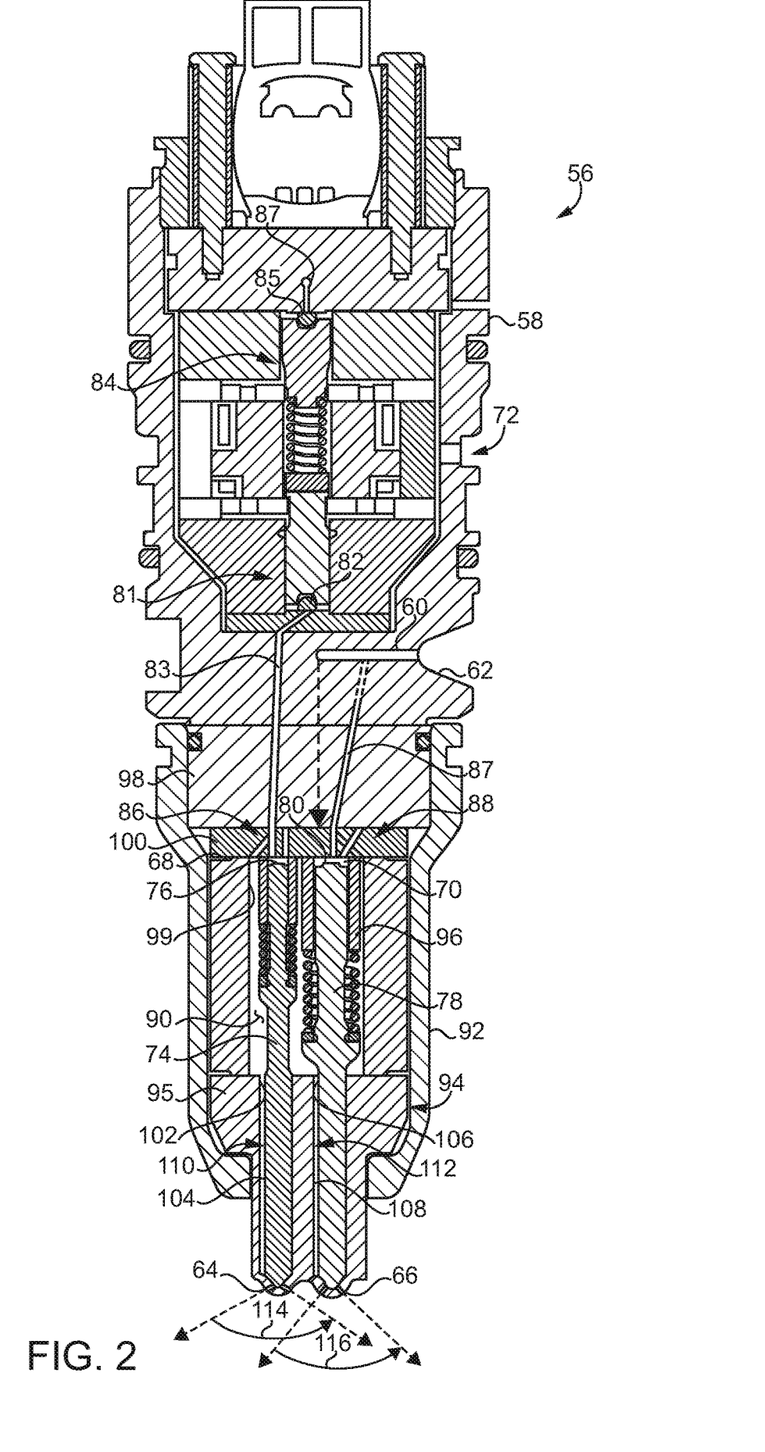
FIG. 2 is a sectioned side view of a fuel injector suitable for use in the internal combustion engine system of FIG. 1.

Referring also now to FIG. 2, there is shown a sectioned view through a liquid fuel injector 56 of a type suitable for use in engine system 8. Fuel injector 56 includes an injector body 58 defining a high-pressure inlet passage 60 connected with a high-pressure inlet 62. Inlet 62 may fluidly connect with reservoir/common rail 52, for example, by way of a so called quill connector in one embodiment. Injector body 58 further defines a first set of nozzle outlets 64, a second set of nozzle outlets 66, a first control chamber 68, and a second control chamber 70 each fluidly connected to high-pressure inlet passage 60. Injector body 58 also defines a low-pressure space 72 that can be a low-pressure outlet or drain, or multiple low-pressure outlets or drains, within injector body 58 or the space outside injector body 58. Fuel injector 56 further includes a first outlet check 74 having a closing hydraulic surface 76 exposed to a fluid pressure of first control chamber 68 and movable between a closed position blocking first set of nozzle outlets 64, and an open position. Fuel injector 56 also includes a second outlet check 78 having a closing hydraulic surface 80 exposed to a fluid pressure of second control chamber 70 and movable between a closed position blocking second set of nozzle outlets 66, and an open position. In the illustrated embodiment first outlet check 74 and second outlet check 78 are arranged side-by-side, and first set of nozzle outlets 64 has at least one of a spray angle, an outlet size, or an outlet number that is different from a spray angle, an outlet size or an outlet number of second set of nozzle outlets 66. First set of nozzle outlets 64 may define a spray angle 114, and second set of nozzle outlets 66 may define a second spray angle 116. In an implementation, spray angle 114 may be larger than spray angle 116. Spray angle 114 might be about 140°, and spray angle 116 might be about 125°. Each of spray angle 114 and spray angle 116 might be in a range from about 125° to about 145°.

Fuel injector 56 further includes a first electrically actuated injection control valve 82 in a first control valve assembly 81. Injection control valve 82 can be a first two-way injection control valve, and is positioned fluidly between first control chamber 68 and low-pressure space 72. A control passage 83 extends between control valve assembly 81 and first control chamber 68. Control valve 82 is movable between a closed position blocking fluid communication between control passage 83 and low-pressure space 72 and an open position at which control passage 83 is fluidly connected to low-pressure space 72. Control valve 82 is thus structured to connect or disconnect a total of two passages. Fuel injector 56 also includes a second electrically actuated injection control valve 85 in a control valve assembly 84. Injection control valve 85 can be a second twoway injection control valve, and is positioned fluidly between second control chamber 70 and low-pressure space 72. A control passage 87 extends between second control chamber 70 and control valve assembly 84. Control valve assembly 84 can function analogously to control valve assembly 81. In the illustrated embodiment each of control valve assembly 81 and control valve assembly 84 is a solenoid actuated control valve assembly structured to vary between a deenergized state where the respective control valves 82 and 85 are at their closed positions, and an energized state where control valves 82 and 85 move in opposition to a spring biasing force to an open position. Certain components are shared among control valve assembly 81 and control valve assembly 84, however, the present disclosure is not thereby limited. It can also be seen from FIG. 2 that control passage 83 and control passage 87 extend through a number of components of injector body 58, and may be out of plane in the view illustrated. Each of injection control valve 82 and injection control valve 85 can include a ball valve or a half-round, hemispheric valve structured to move into and out of contact with a flat valve seat, however, the present disclosure is not thereby limited. Those skilled in the art will be familiar with the design technique of providing for flow to low-pressure space 72 between or among the various components in injector body 58 between injection control valve assemblies 81 and 84 and low-pressure space 72 when injection control valves 82 and 85 are opened.

Injector body 58 further includes a casing 92 and a stack 94 positioned within casing 92. Injector body 58 also defines a common nozzle supply cavity 90 in fluid communication with high-pressure inlet passage 60. Common nozzle supply cavity 90 can be understood as part of high pressure inlet passage 60, which in turn can be understood to extend from high pressure inlet 62 to each of nozzle outlets 64 and nozzle outlets 66. First set of nozzle outlets 64 and second set of nozzle outlets 66 are fluidly connected to common nozzle supply cavity 90 at the open position of first outlet check 74 and second outlet check 78, respectively. Common nozzle supply cavity 90 may be formed within stack 94, and each of first outlet check 74 and second outlet check 78 extends through common nozzle supply cavity 90. Stack 94 also includes a tip piece 95, positioned within casing 92 and having first set of nozzle outlets 64 and second set of nozzle outlets 66 formed therein. A spacer 96, which can be cylindrical in shape, is positioned to abut tip piece 95 and includes a wall 99 extending circumferentially around first outlet check 74 and second outlet check 78 so as to form common nozzle supply cavity 90. Yet another stack piece 98 is positioned at least partially within casing 92, and an orifice plate TOO is sandwiched between stack piece 98 and spacer 96. Each of first outlet check 74 and second outlet check 78 can include opening hydraulic surfaces (not numbered) exposed to a fluid pressure of common nozzle supply cavity 90. Each of first outlet check 74 and second outlet check 78 is further biased closed by way of spring biasing in a generally known manner.

Figure 3:
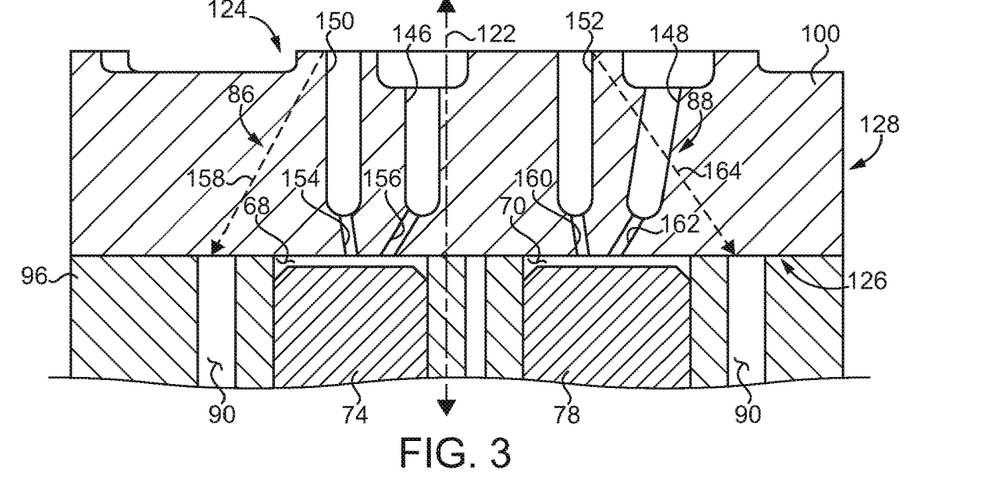
FIG. 3 is a sectioned view through an orifice plate taken along line 3-3 of FIG. 4, according to one embodiment.
Figure 4:
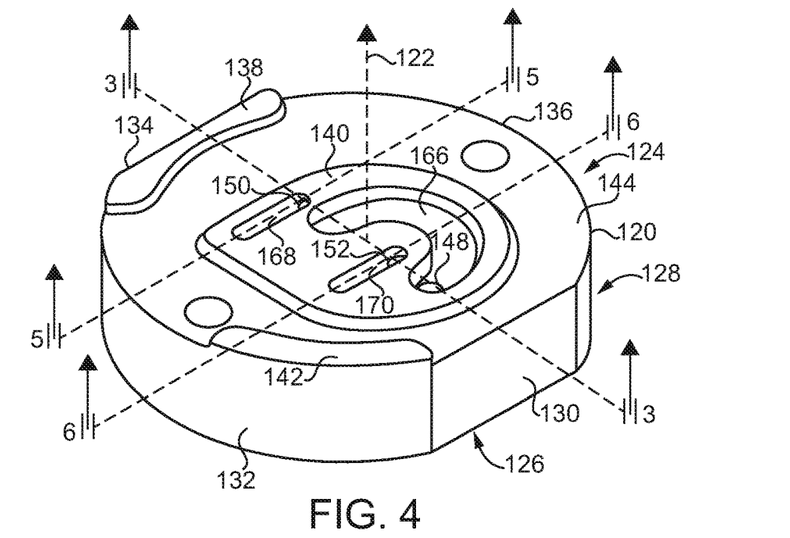
FIG. 4 is a perspective view of an orifice plate, according to one embodiment.

Injector body 58 still further defines a first set of orifices 86 arranged in an A-F-Z pattern among high-pressure inlet passage 60, low-pressure space 72, and first control chamber 68. An "A" orifice is positioned fluidly between a check control chamber and an outlet to low pressure, whereas a "Z" orifice is fluidly between incoming high pressure and a check control chamber, and an "F" orifice fluidly connects a high pressure supply for the Z-orifice to an outlet of the A-orifice. A second set of orifices 88 is arranged in an A-F-Z pattern among high-pressure inlet passage 60, low-pressure space 72, and second control chamber 70. Referring also now to FIGS. 3 and 4, there are shown additional details of orifice plate 100. Orifice plate 100 includes a one-piece orifice plate body 120 defining a center axis 122 extending between an upper plate body side 124 and a lower plate body side 126. Orifice plate body 120 also includes an outer peripheral edge 128 extending circumferentially around center axis 122. In the illustrated embodiment, outer peripheral edge 128 includes a first linear segment 130, a first arcuate segment 132, a second linear segment 134, and a second arcuate segment 136. First and second arcuate segments 132 and 136 are in an alternating arrangement with first and second linear segments 130 and 134. Orifice plate body 120 also has a plurality of raised sealing surfaces including a first raised sealing surface 138, a second raised sealing surface 140, and a third raised sealing surface 142. It can be seen from FIG. 4 that sealing surface 138 and sealing surface 142 are arranged adjacent to first arcuate segment 132 and second linear segment 134, respectively. Orifice plate body 120 also includes a recessed surface 144 positioned axially inward of raised sealing surfaces 138, 140, and 142. Orifice plate body 120 further has a first inlet passage 146 and a second inlet passage 148 extending between upper plate body side 124 and lower plate body side 126, for feeding high-pressure fuel to first control chamber 68 for first outlet check 74 and second control chamber 70 for second outlet check 78, respectively.

Orifice plate body 120 also includes a first outlet passage 150 and a second outlet passage 152 extending between lower plate body side 126 and upper plate body side 124, for connecting first and second control chambers 68 and 70 to low-pressure space 72. First set of orifices 86 in orifice plate body 120 is also shown in FIG. 3 and include a first A-orifice 154 formed in first outlet passage 150, a first Z-orifice 156 formed in first inlet passage 146, and a first F-orifice 158. F-orifice 158 is out of plane in FIG. 3, but described and illustrated elsewhere hereinafter. Second set of orifices 88 in orifice plate body 120 is also shown in FIG. 3 and includes a second A-orifice 160 formed in second outlet passage 152, a second Z-orifice 162 formed in second inlet passage 148, and a second F-orifice 164. First and second F-orifices 158 and 164 fluidly connect first and second outlet passages 150 and 152 to lower plate body side 126 to fluidly connect common nozzle supply cavity 90 in fuel injector 56 to each of first and second control chambers 68 and 70. Provision of F-orifices 158 and 164 assists in refilling of control chambers 68 and 70 at the end of fuel injection, as further discussed herein. It should be appreciated that F-orifices 158 and 164 could connect to high-pressure inlet passage 60 by another architecture. In other words, in a practical implementation strategy F-orifices 158 and 164 connect to common nozzle supply cavity 90, but could be configured otherwise without departing from the scope of the present disclosure. The various orifices described herein could also be positioned in components of stack 94 other than orifice plate 100 in other embodiments.

It can also be noted from FIG. 4 that a first connector channel 166 is formed in upper plate body side 124 and fluidly connects first inlet passage 146 to second inlet passage 148. First connector channel 166 may have a C-shaped configuration, although the present disclosure is not thereby limited. A second connector channel 168 is formed in upper plate body side 124 and fluidly connects first outlet passage 150 to first F-orifice 158. A third connector channel 170 is formed in upper plate body side 124 and fluidly connects first outlet passage 150 to second F-orifice 164. Each of second connector channel 168 and third connector channel 170 may be linear in shape. It can also be noted that each of first, second, and third connector channels 166, 168, and 170 is formed in raised sealing surface 140. The axial depth between raised sealing surfaces 138, 140, and 142 and recessed surface 144 can provide a space that is connected to high pressure when fuel injector 56 is assembled for service. First and second inlet passages 146 and 148 and first and second outlet passages 150 and 152 may be in an alternating arrangement between first and second linear segments 130 and 134 of outer peripheral edge 128.

Figure 5:
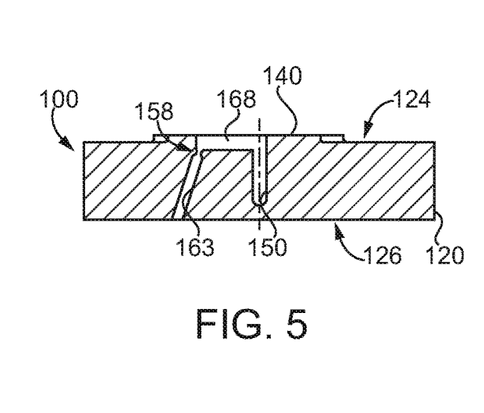
FIG. 5 is a sectioned view taken along line 5-5 of FIG. 4.
Figure 6:
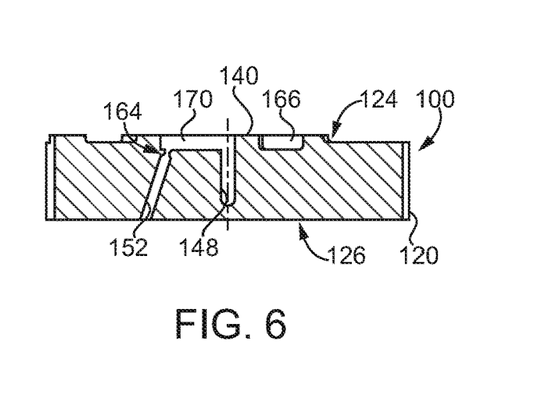
FIG. 6 is a sectioned view taken along line 6-6 of FIG. 4.

Referring also now to FIG. 5 and FIG. 6, there are shown sectioned views taken along lines 5-5 and 6-6 of FIG. 4. It will also be noted that the sectioned view in FIG. 3 includes subject matter of orifice plate 100 taken along line 3-3 of FIG. 4. It can be seen from FIG. 5 and FIG. 6 that F-orifices 158 and 164 each extend at an angle from the corresponding connector channel 168 and 170, relative to center axis 122. It will be recalled that F-orifices 158 and 164 provide fluid connections between outlet passages 150 and 152 and common nozzle supply cavity 90. A first fluid passage 163 extends between upper plate body side 124 and lower plate body side 126, and a second fluid passage 152 also extends between upper plate body side 124 and lower plate body side 126. First fluid passage 163 includes first F-orifice 158 and opens at lower plate body side 126, whereas second fluid passage 152 includes second F-orifice 160 and opens at lower plate body side 126. It can also be noted from FIG. 35 that each of first and second A-orifices 154 and 160 and each of first and second Z-orifices 156 and 162 is formed adjacent to lower plate body side 126. Each of first and second F-orifices 156 and 158 can be formed adjacent to upper plate body side 124. Sizes of each of the A, F, and Z-orifices herein may be within an order of magnitude of one another.

Returning to FIG. 2, it will be recalled that each of first outlet check 74 and second outlet check 78 extends through tip piece 95. Tip piece 95 has therein a first guide bore 102 that receives first outlet check 74 and forms a first nozzle supply passage 104 with first outlet check 74. Tip piece 95 also has therein a second guide bore 106 that receives second outlet check 78 and forms a second nozzle supply passage 108 with second outlet check 78. A first M-orifice 110 is formed within tip piece 95 to limit flow through first nozzle supply passage 104. A second M-orifice 112 is formed within tip piece 95 to limit flow through second nozzle supply passage 108.

INDUSTRIAL APPLICABILITY

Referring to the drawings generally, it will be recalled that engine system 8 can be operated in multiple different modes. During a diesel-only mode second outlet check 78 can be operated by way of injection control valve assembly 84 to open and close to inject a main charge of diesel fuel in an engine cycle. Embodiments are also contemplated wherein both of second outlet check 78 and first outlet check 74 are operated by way of control valve assembly 84 and control valve assembly 81, respectively, to cooperate in injection of a main charge of diesel fuel, provide successive injections within the same engine cycle, such as pilot injections, pre-injections, or post-injections or perform other variations. In a typical diesel-only mode, injection control valve assembly 84 can be energized to lift injection control valve 85 from its seat to cause a drop in pressure in second control chamber 70, in turn enabling pressure acting on opening hydraulic surfaces of second outlet check 78 in common nozzle supply cavity 90 to lift second outlet check 78 to open second set of nozzle outlets 66. When injection is to be ended, or just prior to when injection is to be ended, injection control valve assembly 84 is de-energized, to close injection control valve 85 and enable pressure to increase in second control chamber 70 and act upon closing hydraulic surface 80 to cause second outlet check 78 to close. Piston 16 moves in a conventional four-phase cycle to intake, compress, combust, and exhaust the mixture of air and diesel fuel.

Operation in a mixed or blended mode, where liquid fuel is used for pilot ignition, occurs in a generally analogous manner, with injection control valve assembly 81 being energized and de-energized to vary pressure within control chamber 68 and cause first outlet check 74 to adjust between its open and closed positions. Rather than a main charge of injected liquid fuel compression igniting, in a dual fuel mode the relatively small pilot charge will be compression ignited, whereupon the combustion flame of the pilot charge can ignite the main charge of gaseous fuel delivered into the corresponding combustion cylinder 14. As noted above, employing twin outlet checks can enable separation of design of each outlet check for different purposes, namely, injection of a main charge versus injection of a pilot charge. It will also be recalled that certain parameters of injection and/or design of the respective outlet checks can differ to obtain different injection amounts and different injection properties. A pilot charge may be injected at a relatively shallower angle, whereas a main charge can be injected at a somewhat deeper angle as discussed herein. It will also be recalled that orifice sets 86 and 88 affect the nature of fuel injection, and can be sized to various ends. F-orifices can be employed to slow a rate of pressure drop in the control chambers when connected to low pressure, and can hasten the rate of pressure build at the end of injection. As a result, the F-orifices can assist in obtaining a relatively square rate shape to an end of injection, or tailored to obtain another rate shape. Z-orifices can analogously assist in obtaining a relatively square end of injection shape, for example. Varying a size of a Z-orifice within the present context tends to have a relatively larger effect on end-of-injection properties than varying the size of an F-orifice. The M-orifices are controlled clearances around the outlet checks that act to retard the start of injection. The A-orifices also tend to affect start of injection, assisting in controlling spilling of pressure from the associated control chamber.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A liquid fuel injector for an internal combustion engine comprising:
an injector body defining a high pressure inlet passage, a first set of nozzle outlets, a second set of nozzle outlets, a first control chamber and a second control chamber each in fluid communication with the high pressure inlet passage, and a low pressure space;
a first outlet check having a closing hydraulic surface exposed to a fluid pressure of the first control chamber and movable between a closed position blocking the first set of nozzle outlets, and an open position;
a second outlet check having a closing hydraulic surface exposed to a fluid pressure of the second control chamber and movable between a closed position blocking the second set of nozzle outlets, and an open position;
a first two-way injection control valve positioned fluidly between the first control chamber and the low pressure space;
a second two-way injection control valve positioned fluidly between the second control chamber and the low pressure space;
the injector body further defining a first set of orifices arranged in an A-F-Z pattern among the high pressure inlet passage, the low pressure space, and the first control chamber, and a second set of orifices arranged in an A-F-Z pattern among the high pressure inlet passage, the low pressure space, and the second control chamber;
the injector body further defining a common nozzle supply cavity in fluid communication with the high pressure inlet passage, and the first set of nozzle outlets and the second set of nozzle outlets being in fluid communication with the common nozzle supply cavity at the open position of the first outlet check and the second outlet check, respectively; and
the injector body further including a casing and a stack positioned within the casing, and wherein the common nozzle supply cavity is formed within the stack and each of the first outlet check and the second outlet check extends through the common nozzle supply cavity.

2. The fuel injector of claim 1 wherein;
the first set of orifices includes a first F-orifice and the second set of orifices includes a second F-orifice; and
the first F-orifice is formed in a first fluid passage opening to the common nozzle supply cavity, and the second F-orifice is formed in a second fluid passage opening to the common nozzle supply cavity.

3. The fuel injector of claim 2 wherein the stack includes an orifice plate and each of the first F-orifice and the second F-orifice is formed in the orifice plate.

4. The fuel injector of claim 3 wherein the orifice plate includes an upper plate side, and a lower plate side exposed to the first control chamber, the second control chamber, and the common nozzle supply cavity, and wherein each of the first F-orifice and the second F-orifice is within a fluid passage that opens to the common nozzle supply cavity at the lower plate side.

5. The fuel injector of claim 1 wherein the valve stack includes a tip piece having therein a first guide bore that receives the first outlet check and forms a first nozzle supply passage with the first outlet check, and a second guide bore that receives the second outlet check and forms a second nozzle supply passage with the second outlet check.

6. The fuel injector of claim 5 wherein a first M-orifice is formed within the tip piece to limit flow through the first nozzle supply passage and a second M-orifice is formed within the tip piece to limit flow through the second nozzle supply passage.

7. The fuel injector of claim 1 wherein the first outlet check and the second outlet check are arranged side-by-side, and the first set of nozzle outlets has at least one of a spray angle, an outlet size, or an outlet number that is different from a spray angle, an outlet size or an outlet number of the second set of nozzle outlets.

8. A fuel system for an internal combustion engine comprising:
a pressurized liquid fuel supply;
a plurality of liquid fuel injectors each defining a high pressure inlet passage, a first set of nozzle outlets, a second set of nozzle outlets, a first control chamber and a second control chamber each in fluid communication with the high pressure inlet passage, and a low pressure space;
the plurality of liquid fuel injectors each including a first outlet check having a closing hydraulic surface exposed to a fluid pressure of the first control chamber, and a second outlet check having a closing hydraulic surface exposed to a fluid pressure of the second control chamber;
the plurality of liquid fuel injectors each further including a first injection control valve positioned fluidly between the first control chamber and the low pressure space, and a second injection control valve positioned fluidly between the second control chamber and the low pressure space;
the plurality of liquid fuel injectors each further defining a first set of orifices arranged in an A-F-Z pattern among the high pressure inlet passage, the low pressure space, and the first control chamber, and a second set of orifices arranged in an A-F-Z pattern among the high pressure inlet passage, the low pressure space, and the second control chamber;
the plurality of liquid fuel injectors each further defining a common nozzle supply cavity in fluid communication with the high pressure inlet passage, and the first outlet check and the second outlet check each being movable between an open position where the corresponding first set of nozzle outlets and second set of nozzle outlets are in fluid communication with the common nozzle supply cavity, and a closed position;
a pressurized gaseous fuel supply, and at least one gaseous fuel admission valve that is separate from the plurality of liquid fuel injectors;
each of the plurality of liquid fuel injectors further includes a stack having an orifice plate with an upper plate side, and a lower plate side exposed to the first control chamber, the second control chamber, and the common nozzle supply cavity.

9. The fuel system of claim 8 wherein:
the first outlet check is a pilot injection check, and the second outlet check is a main injection check arranged side-by-side with the pilot injection check; and
the first set of nozzle outlets has at least one of a spray angle, an outlet size, or an outlet number that is different from a spray angle, an outlet size or an outlet number of the second set of nozzle outlets.

10. The fuel system of claim 9 wherein the first set of nozzle outlets defines a relatively wider spray angle and the second set of nozzle outlets defines a relatively narrower spray angle.

11. The fuel system of claim 8 wherein the first set of orifices includes a first F-orifice and the second set of orifices includes a second F-orifice, and each of the first F-orifice and the second F-orifice is formed in a fluid passage opening to the common nozzle supply cavity.

12. The fuel system of claim 8 wherein each of the plurality of liquid fuel injectors further includes a stack having a tip piece with a first guide bore therein that receives the first outlet check and forms a first nozzle supply passage with the first outlet check, and a second guide bore that receives the second outlet check and forms a second nozzle supply passage with the second outlet check.

13. The fuel system of claim 12 wherein a first M-orifice is formed within the tip piece to limit flow through the first nozzle supply passage and a second M-orifice is formed within the tip piece to limit flow through the second nozzle supply passage.

14. An orifice plate for a stack in a liquid fuel injector in a fuel system comprising:
- a one-piece orifice plate body defining a center axis extending between an upper plate body side and a lower plate body side, and an outer peripheral edge extending circumferentially around the center axis;
- the orifice plate body further having a plurality of raised sealing surfaces formed on the upper side, for forming seals with an adjacent stack piece in the stack, and a recessed surface positioned axially inward of the raised sealing surfaces;
- the orifice plate body further having a first inlet passage and a second inlet passage extending between the upper plate body side and the lower plate body side, for feeding high pressure fuel to a first control chamber for a first outlet check and a second control chamber for a second outlet check, respectively;
- the orifice plate body further having a first outlet passage and a second outlet passage extending between the lower plate body side and the upper plate body side for connecting the first and the second control chamber to a low pressure space;
- a first set of orifices in the orifice plate body including a first A-orifice formed in the first outlet passage, a first Z-orifice formed in the first inlet passage, and a first F-orifice;
- a second set of orifices in the orifice plate body and including a second A-orifice formed in the second outlet passage, a second Z-orifice formed in the second inlet passage, and a second F-orifice;
- the first and the second F-orifices fluidly connecting the first and the second outlet passages to the lower plate body side to fluidly connect a nozzle supply cavity in the liquid fuel injector to each of the first and the second control chambers by way of the first and the second outlet passages;
- a first connector channel is formed in the upper plate body side and fluidly connects the first inlet passage to the second inlet passage;
- a second connector channel is formed in the upper plate body side and fluidly connects the first outlet passage to the first F-orifice; and
- a third connector channel is formed in the upper plate body side and fluidly connects the second outlet passage to the second F-orifice.

15. The orifice plate of claim 14 wherein:
the first connector channel is arcuate, and each of the second and the third connector channel is linear; and
each of the first and the second A-orifices and the first and the second Z-orifices is formed adjacent to the lower plate body side, and each of the first and the second F-orifices is formed adjacent to the upper plate body side.

16. The orifice plate of claim 14 wherein:
the outer peripheral edge has a first and a second arcuate segment in an alternating arrangement with a first and a second linear segment; and
the first and the second inlet passages and the first and the second outlet passages are in an alternating arrangement between the first and the second linear segments.

* * * * *